United States Patent Office 3,427,224
Patented Feb. 11, 1969

3,427,224
SHORTENED FERMENTATION PROCESS FOR OBTAINING D-MANNITOL
Karl L. Smiley, Groveland, Martin C. Cadmus, Peoria, and Seymour Peter Rogovin, Pekin, Ill., assignors to the United States of America as represented by the Secretary of Agriculture
No Drawing. Filed Mar. 15, 1967, Ser. No. 624,120
U.S. Cl. 195—35  1 Claim
Int. Cl. C12d 13/02, 13/00

ABSTRACT OF THE DISCLOSURE

D-Mannitol is obtained from glucose in nearly 50% yields in only 8 to 13 days by highly aerated submerged fermentations of either *Aspergillus candidus* NRRL 305 or NRRL 3248 if the glucose content of the medium is periodically replenished prior to virtual exhaustion, thus preventing the mold from materially metabolizing the very mannitol it has produced.

Background of the invention

This invention relates to a greatly accelerated process for the efficient and industrially practicable microbiological conversion of glucose to D-mannitol by highly aerated fermentations in a successively replenished substrate by certain strains of *Aspergillus candidus*.

Although Birkenshaw et al., Trans. Royal Soc. London B220:153 (1931), obtained D-mannitol from fermenting an unrestored original 5% content of glucose using several species of Aspergilli, their flasks were not agitated and it was a fact found necessary to restrict aeration to not more than a half hour per day, whereby the consequent unappreciated partial suppression of the organism's metabolism resulted in the industrially unappealing requirement that each batch be fermented for about 1 to 2 months in order to obtain D-mannitol yields of about 50% based on the essentially trivial 5% initial concentration of glucose.

The apparently uniform industrial preparation of mannitol by the hydrogenation of fructose indicates that the long available discovery by Yamasaki et al., Biochem. Z., 291:340 (1937), that molds of the *Aspergillus glaucus* group produce mannitol from glycerol also lacks commercial applicability or monetary advantage.

Summary

The primary object of the present invention is a greatly shortened and thusly commercially attractive process for the microbiological conversion of glucose to D-mannitol in yields amounting to at least on the order of about 45–47% based on total cumulative glucose contents of about 20% in the fermentation medium.

A process fulfilling the above object has now been accomplished partly through the not astonishing discovery per se that *A. candidus* NRRL 305 and NRRL 3248 convert glucose to mannitol but, much more importantly, by the related discoveries that the conversion of glucose to D-mannitol by these specific molds is greatly stimulated rather than markedly suppressed by continuous forced aeration and agitation as was taught for closely related species of Aspergilli by Birkenshaw et al., supra, coupled with our unobvious observation that when the mold is in the aeration-induced hypermetabolic state it responds to a depletion of the glucose content of the fermentation medium to less than a critical concentration of about 0.1% (as occurs in the presence of aeration by about the end of the first day from appreciable depletion of the approximately 2.3–3.5% glucose equivalent of the ground corn original carbon source) with a pronounced tendency to eschew the relatively scanty residual glucose and instead rather preferentially "cannibalize" the very mannitol it has produced, which tendency is readily overcome by periodic or continuous small additions of sterile glucose solution. We also found that *A. candidus* NRRL 305 produces about 50% more mannitol at 34° C. than at 31° C. (0.64 g./100 ml./day vs. 0.4 g./100 ml./day) whereas NRRL 3248, which produces 0.67 g. mannitol 100 ml./day at either 31° C. or 34° C. during the first 9 days of fermentation, produces 0.92 g./100 ml./day during the succeeding 4 days if maintained at 31° C. and only 0.3 g./100 ml./day if the fermentation temperature during this period is 34° C.

Although it is believed that the aforesaid disclosure, to the effect that a greatly accelerated production and recovery of mannitol requires not only strongly aerobic fermentation but also the continuous availability of at least about 0.1% of unconverted free glucose, would enable those skilled in the art to practice our invention with only routine experimentation, the following examples are given for the purpose of setting forth at least relatively optimized embodiments of our invention.

Example 1

An agar plug removed from a preserved mycelial culture of *Aspergillus candidus* NRRL 305 was aseptically transferred to a cotton-plugged 250-ml. Erlenmeyer flask containing 100 ml. of 0.5% commercial yeast extract medium also containing 5 g. of ground whole corn. The flask was maintained at 28° C. on a rotary shaker for 48 hours. Then 10 ml. of the above culture was transferred to a second Erlenmeyer again containing 100 ml. of the identical medium. After 48 hours of fermentation the contents of this starter flask were transferred by air pump to a 2.8-liter Fernbach flask containing 1 liter of a 1.0% yeast extract fermentation medium fortified by the addition of 33 g. of finely ground corn (thus providing ca. 2.3% glucose equivalent) and also containing dissolved therein the salts of Czapek-Dox medium in the following amounts per liter:

| | G. |
|---|---|
| NaNO$_3$ | 3 |
| K$_2$HPO$_4$ | 1 |
| MgSO$_4$ | 0.5 |
| KCl | 0.5 |
| FeSO$_4$ | 0.1 |

The Fernbach flask in a room held at 28° C. was placed on a shaker rotating at 200 r.p.m. At 24 hours and again at 48 hours of fermentation the medium was fortified by respective small additions of sterile solution each containing 30 g. of glucose. Substantially complete mycelial proliferation having apparently been reached at 60 hours, the ten subsequent 24-hour additions of glucose solution (ending on the 12th day) each contained 10 g. glucose, the fermentation then being terminated at the end of the 13th day by filtration to remove the mycelia since GLC (gas-liquid chromatography) analyses of the 12th and 13th-day concentrations of D-mannitol and corresponding "Testape" estimations of glucose showed a sudden and distinct decrease in the conversion efficiency of the microorganism. Following removal of the vegetative mycelia by filtration the concentration of D-mannitol in the ca. 900 ml. cell-free filtrate was found by GLC analysis to be 4.74%, representing an overall production of 42.7 g. mannitol and a net production conversion efficiency of 31.0% based on the 187 g. of total glucose including that contributed by the enzymic hydrolysis of the starch content of the ground corn. No attempt was made to crystallize the mannitol from the filtrate.

Example 2

A larger (900 ml.) batch of *A. candidus* NRRL 305 "starter flask" material identical with that of Example 1 excepting that the yeast extract concentration was 1.0% prepared and introduced by air pump to a pilot plant 20-liter fermenter containing 8100 ml. of an 1.0% yeast extract fermentation medium that also contained the already described concentrations of Czapek-Dox salts and a 5.0% addition of ground whole corn (3.5% glucose equivalent). The fermenter, set to provide a temperature of 34° C., was stirred at 500 r.p.m., 4500 ml. (0.5 v./v.) of sterile air per minute being admitted thereto. The extensive early foaming, which was only slightly diminished by the addition of a few drops of a commercially available silicone type antifoam agent, was greatly reduced by the addition of 9 g. (0.1%) of enzyme hydrolyzed casein, said casein being shown by other experiments to have no effect on the production of the mannitol. It might be pointed out that extensive development of foam does not occur in Fernbach flasks, and that the foams are purposely suppressed in the large fermenters merely because they pose a possible threat to the performance of an electrical control element located in the neck of the fermenter.

The residual glucose concentration at 24 hours of fermentation being 0.31%, we fortified the fermentation by the addition of sterile aqueous concentrated solution containing 360 g. glucose (a 4% addition of glucose based on the 9-liter fermentation) thus raising the glucose concentration to 4.31%. At the end of the 2nd day of fermentation, the residual glucose level was 1.34%, so only 270 g. (3.0%) glucose was added, bringing the combined glucose level to 4.34%. GLC analysis of a filtered sample just prior to fortification showed the concentration of mannitol in the cell-free filtrate to be 1.41% representing a 22.9% conversion based on the glucose consumed.

At the end of the 3rd day, the residual glucose level was found to be 1.97%. Glucose in the amount of 135 g. (1.5%) was added and identical additions were made at the end, respectively, of the 4th, 5th, and 6th days.

The concentration of residual glucose at the end of the 7th day being 2.09%, the supplementation was cut to 90 g. (1.0%) glucose, with the same amount being added at the end of the 8th day (1.53% residual content) at which time the mannitol concentration by GLC was 6.18%, representing a 38.8% conversion of the glucose consumed. At the end of the next 24 hours (9th day), the residual glucose content was 1.75% and the mannitol concentration in a filtered aliquot was 7.25%, indicating a 43.3% production based on the consumed 90.5% of the total available glucose.

The fermentation was terminated at this time (9th day) at which time the crude culture broth, weighing 8185 g., was filtered to provide 6823 ml. of a cell free filtrate weighing 7080 g. Portions of the filtrate were separately treated, as set forth below, to establish suitable conditions for the recovery of the mannitol therefrom.

Recovery of the mannitol from the refrigerated filtrate having been delayed for several weeks by unavoidable circumstances, a sample was re-analyzed by GLC which now showed a slightly lower mannitol concentration of 7.07 g./100 ml., the difference representing either inherent variability of GLC replication or perhaps slight destruction by traces of enzyme.

A 4-liter portion of the filtrate containing 282.8 g. of D-mannitol was concentrated under vacuum to a volume of 1 liter, seeded with 1.2 g. D-mannitol, cooled to about 6° C., and stored at 6° C. for 8 hours to crystallize the mannitol. After filtering, washing and vacuum drying, the first crop of crystals weighed 147.3 g. The filtrate, to which the wash water had been added, was concentrated to half its volume, seeded with 0.5 g. of D-mannitol, and held at 6° C. for about 6 hours before harvesting the second crop of crystals (40.6 g.). The wash-containing filtrate (740 ml.) was concentrated to a volume of 460 ml., seeded with 0.2 g. of D-mannitol, and chilled to provide 53.9 g. of dry crystals of D-mannitol as the third crop. Thus, the total yield of 241.8 g. out of 282.8 g. represented an 85.5% recovery. The final filtrate, containing 41 g. of uncrystallized original product and 1.9 g. of seed material, obviously could be added to the filtrate from a second fermentation. It will be seen that the above partial evaporations of the filtrates provide mannitol concentrations of about 28% to about 21%. Subsequent experiments showed that optimal crystallizations are obtained when the filtrate is concentrated so as to provide concentrates containing 22% to 24% of mannitol.

It may be pointed out that precipitation with alcohol would have no commercial status because we have found that the mannitol does not begin to crystallize unless at least about four or more volumes of alcohol have been added.

Example 3

Another pilot plant fermentation of *A. candidus* NRRL 305 was conducted precisely in the manner set forth in Example 2 with the exceptions that the ground corn component was lowered to 3.5% (2.5% glucose equivalent) and the seven restorative additions of glucose solution amounted, respectively, to 3.0% and 3.25%, three each of 2.0%, 1.5%, and 2.0%. The residual glucose concentrations immediately prior to each of the additions was quite uniformly about 0.1%. The total glucose consumed was 98.6% of the total available (unused glucose at the end of the 8th day ca. 0.27%). The concentrations of D-mannitol by GLC in the final filtrate was 8.53%, equivalent to a 47.4% yield based on the glucose consumed. Recovery of the mannitol was not attempted.

Example 4

*A. candidus* NRRL 3248 was substituted for NRRL 305 in a pilot plant fermentation conducted in the manner of Example 3 excepting that the fermentation temperature was 31° C., the duration of the fermentation was extended from 8 days to 10 days and the culture was agitated at 400 r.p.m. instead of 500 r.p.m., and also that the additions of glucose were, respectively, 3.0%, 2.0%, zero, 0.5%, 1.25%, 1.0%, 1.25%, 1.25%, and 1.0%. The D-mannitol concentration in the 8th day filtrate was 4.77%, which increased to 6.23% at the end of the 10th day, equivalent to a 46.2% conversion based on the 98.2% of glucose consumed.

Example 5

Example 2 was repeated excepting that the ground corn component amounted to 4.5% (equivalent to 3.15% glucose), and the 8 successive daily additions of glucose, beginning at the end of the first 24 hours of fermentation, amounted, respectively, to 3.5% (315 g.), 3.0% (270 g.), 2.0% (180 g.), 2.0% (180 g.), 2.0% (180 g.), 0.3% (27 g.), 0.2% (18 g.), and 0.4% (36 g.), the corresponding unused glucose concentrations immediately prior to the above additions being, respectively, 0.49%, 1.07%, 2.42%, 2.38%, 2.54%, 3.12%, 1.76%, and 0.48%. The residual glucose concentration at the termination of the fermentation (24 hours after the last addition of glucose) was 0.18%. The concentration of D-mannitol in the 6002 ml. (6955 g.) total of final filtrate (including analytical aliquot) from an unevaporated 8040 g. of mycelium-containing broth was 8.10% or 62.6 g. D-mannitol per liter of original fermentation medium, equivalent to a 48.9% conversion of the total glucose used up. An additional amount of D-mannitol undoubtedly was occluded on the unused mycelium and could have been washed therefrom or returned for use in a fresh fermentation if desired.

Five liters of the above filtrate were combined with 9.8 liters of filtrate from two other similar fermentations that had been started 1 day later and therefore had a slightly lower content of mannitol. The 14,800 ml. of pooled filtrate containing 6.88% mannitol (1018 g.) was concentrated to a volume of 4690 ml. (21.7% content), seeded with 2 g. of mannitol crystals, and stirred slowly for ca. 1 hour at 8° C. to provide 510 g. of crystals after washing with 104 ml. of cold distilled water. The combined filtrate and wash were further evaporated to a volume of 2100 ml. (24.3% manitol), seeded with 1.2 g. of crystals, and crystallized as previously, 250 g. of crystals being obtained.

Further evaporation to a volume of 800 ml. and seeding with 0.6 g. of mannitol eventuated in a third crop weighing 127 g. Thus, a total of 887 g. or 87% of the D-mannitol was isolated, the remaining 13% and added seed being transferable to another filtrate.

We claim:
1. An improved microbiological process for obtaining D-mannitol within 8 to 13 days in yields amounting substantially to about 50% based on the glucose consumed, said process comprising the steps of:
  (a) preparing a "starter" culture by inoculating an 0.5% yeast extract medium containing 3% to 5% of whole ground corn with a mold selected from the group consisting of *Aspergillus candidus* NRRL 305 and *A. candidus* NRRL 3248, and fermenting the inoculated medium at 28° C. for about 48 hours on a rotary shaker;
  (b) introducing about 1 part by weight of said "starter" culture into a fermentation vessel containing about 10 parts of a 1% yeast extract medium that is fortified with the salts of Czapek-Dox medium that are present in their standard concentrations characteristic of the latter medium, and also containing from 3.3% to about 5% of ground whole corn;
  (c) fermenting the thusly inoculated medium at 28° C. to 34° C. under agitated or aerated submerged culture conditions for from about 8 days to about 13 days with daily additions of sufficient sterile glucose solution to substantially restore the glucose concentration of the medium and thus prevent the mold mycelium from reducing the glucose concentration to or below the critical level of about 0.1% during the 24-hour period until the next addition;
  (d) filtering of the mycelium to provide a cell-free filtrate containing D-mannitol in a concentration of about 5% to about 8%, and;
  (e) recovering about 85% of the total D-mannitol content of the filtrate by fractional crystallizations at about 6° C. from seeded successive partial evaporative concentrates of the filtrate.

References Cited

Prescott et al., Industrial Microbiology, 3rd Edition, McGraw-Hill Book Co. Inc., pp. 644–646 (1959).

ALVIN E. TANENHOLTZ, *Primary Examiner.*